(12) United States Patent
Lepper

(10) Patent No.: US 11,486,495 B2
(45) Date of Patent: Nov. 1, 2022

(54) SEALING DEVICE

(71) Applicant: ILLINOIS TOOL WORKS INC., Glenview, IL (US)

(72) Inventor: Mark O. Lepper, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 10 days.

(21) Appl. No.: 17/147,116

(22) Filed: Jan. 12, 2021

(65) Prior Publication Data
US 2021/0246984 A1 Aug. 12, 2021

Related U.S. Application Data

(60) Provisional application No. 62/975,278, filed on Feb. 12, 2020.

(51) Int. Cl.
*F16J 15/3204* (2016.01)

(52) U.S. Cl.
CPC ............... *F16J 15/3204* (2013.01)

(58) Field of Classification Search
CPC .... F16J 15/00; F16J 15/02; F16J 15/46; F16J 15/48; F16J 15/16; F16J 15/50; F16J 15/52; F16J 15/32; F16J 15/3204; F16J 15/3216; F16J 15/322; F16B 5/0657; F16B 5/065; F16B 21/076
USPC ......................................................... 277/569
See application file for complete search history.

(56) References Cited

U.S. PATENT DOCUMENTS

| | | | |
|---|---|---|---|
| 9,631,653 B2* | 4/2017 | Flynn | F16B 13/063 |
| 10,288,098 B2* | 5/2019 | Meyers | B60R 13/0206 |
| 10,408,248 B1* | 9/2019 | Safry | F16B 5/0628 |
| 10,683,882 B2* | 6/2020 | Scroggie | F16B 2/22 |
| 2018/0209463 A1* | 7/2018 | Glickman | B60Q 1/0441 |

* cited by examiner

*Primary Examiner* — Nathan Cumar
(74) *Attorney, Agent, or Firm* — Neal, Gerber & Eisenberg LLP

(57) ABSTRACT

Various embodiments of the present disclosure provide a sealing device that includes a locking pin, (2) an insert, and (3) a grommet.

20 Claims, 13 Drawing Sheets

SEALING DEVICE

PRIORITY CLAIM

This application claims priority to and the benefit of U.S. Provisional Application No. 62/975,278, which was filed on Feb. 12, 2020 and is hereby incorporated by reference in its entirety.

BACKGROUND

Various holes are typically formed in objects (such as panels) during the assembly of vehicles. Many of these holes are to be subsequently sealed during the assembly process. Various known plugs are used during the assembly of vehicles to plug a hole by forming a seal with an adjacent surface. In some instances, a deformity along the adjacent surface may affect the shape of the hole to be plugged. Therefore, there is a need for a sealing device that is capable of plugging a relatively wide range of differently-shaped and differently-sized holes formed during the assembly of a vehicle.

Additionally, various objects (such as panels) are fastened together during the assembly of vehicle. Oftentimes, the objects are fastened together via fasteners that extend through aligned holes of the objects. In many instances, the aligned holes through which the fastener extends are to be sealed during the assembly process. Therefore, there is a need for a sealing device that is capable of fastening two or more objects together during the assembly of a vehicle.

BRIEF SUMMARY

Various embodiments of the present disclosure provide a sealing device that can be used as a plug and/or a sealing fastener. The sealing device is capable of forming seals on two opposing surfaces adjacent any one of a plurality of differently-sized and differently-shaped holes.

One example sealing device of the present disclosure includes a grommet shaft insertable into an object hole defined by one or more objects; a grommet head including a grommet head plate defining a grommet outer edge and a grommet under surface, the grommet shaft extending from the grommet under surface of the grommet head plate; and an outer flange extending from the grommet outer edge of the grommet head plate, the outer flange engageable with a first object surface to form a first seal on a first side of the one or more objects; and the grommet defining a grommet bore hole extending through the grommet head and the grommet shaft; an insert including an insert shaft insertable into the grommet bore hole, the insert defining an insert through hole extending through the insert shaft; and a locking pin including a pin shaft drivable into the insert through hole to retain the grommet shaft within the object hole.

Another example sealing device of the present disclosure includes a grommet including a grommet head; and a grommet shaft extending from the grommet head and insertable into an object hole defined by one or more objects; the grommet defining a grommet bore hole extending through the grommet head and the grommet shaft; an insert including an insert shaft insertable into the grommet bore hole, the insert defining an insert through hole extending through the insert shaft; and a locking pin including a pin shaft drivable into the insert through hole to retain the grommet shaft within the object hole, wherein the insert shaft is to push the grommet shaft to flex radially outwardly as the locking pin is driven into the insert through hole to cause the grommet shaft to engage an edge that extends along an object surface to form a seal on a side of the one or more objects.

Another example sealing device of the present disclosure includes a grommet including a grommet shaft insertable into an object hole defined by an object; a grommet head including a grommet head plate and an outer flange extending from the grommet head plate, the outer flange engageable with a first object surface to form a first seal on a first side of the object; and the grommet defining a grommet bore hole extending through the grommet head and the grommet shaft; an insert including an insert shaft insertable into the grommet bore hole, the insert defining an insert through hole extending through the insert shaft; and a locking pin including a pin shaft drivable into the insert through hole to retain the grommet shaft within the object hole, wherein the insert shaft is configured to push the grommet shaft to flex radially outwardly as the locking pin is driven into the insert through hole to cause the grommet shaft to engage an edge that extends along a second object surface to form a second seal on a second side of the object.

Other objects, features, and advantages of the present disclosure will be apparent from the following detailed disclosure and accompanying drawings.

DETAILED DESCRIPTION

Figure 1:
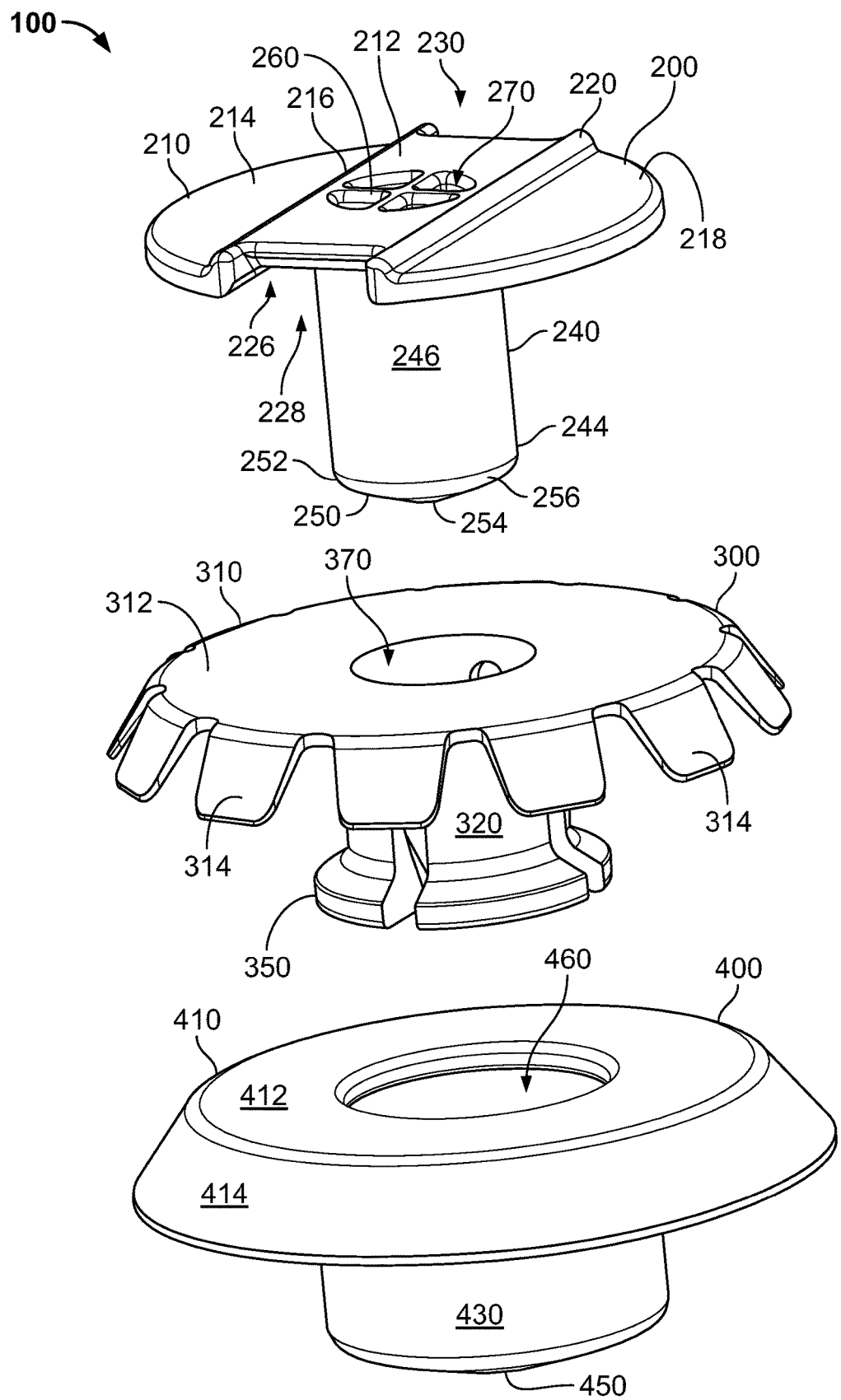
FIG. 1 is an exploded perspective view of an example sealing device of one embodiment of the present disclosure.

While the systems, devices, and methods described herein may be embodied in various forms, the drawings show and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Various embodiments of the present disclosure provide a sealing device that can be used as a plug and/or a sealing fastener in the assembly of a vehicle. For instance, in various embodiments of the present disclosure, the sealing device is capable of plugging holes of various depths, diameters, shapes, edge deformities (such as dents and/or disruptions), etc. In various embodiments of the present disclosure, the sealing device is capable of being inserted into two or more aligned holes of two or more respective objects (such as panels) to couple those objects together and to form a seal connection with one or more of those objects. In various embodiments of the present disclosure, the sealing device is capable of forming seals on two opposing surfaces adjacent to any one of a plurality of differently-sized and differently-shaped holes in which the sealing device is inserted. It should be appreciated that the sealing device of the present disclosure is not limited to use in the assembly of a vehicle.

In various embodiments of the present disclosure, the sealing device includes: (1) a grommet, (2) an insert, and (3) a locking pin. The grommet includes: (1) a grommet head and (2) a grommet shaft extending from an under surface of the grommet head. The grommet shaft is insertable into a hole defined by one or more objects. The grommet defines a grommet bore hole extending through the grommet head and the grommet shaft. In various embodiments of the present disclosure, the grommet head includes: (1) a grommet head plate defining a grommet outer edge and a grommet under surface and (2) an outer flange extending from the grommet outer edge of the grommet head plate. The outer flange is engageable with a first surface of the one or more objects to form a first seal on a first side. The insert includes an insert shaft insertable into the grommet bore hole and defines an insert through hole extending through the insert shaft. The locking pin includes a pin shaft that is drivable into the insert through hole to retain the grommet shaft within the hole of the one or more objects. In various embodiments of the present disclosure, the insert shaft is used to push the grommet shaft to flex radially outwardly as the locking pin is driven into the insert through hole to cause the grommet shaft to engage an edge that extends along a second surface to form a second seal on a second side opposite the first side.

Turning to the figures, one example embodiment of a sealing device of the present disclosure is illustrated and generally indicated by numeral 100. As best shown in FIG. 1, the illustrated example sealing device 100 includes: (1) a locking pin 200, (2) an insert 300, and (3) a grommet 400, as further described in detail below.

Figure 2:
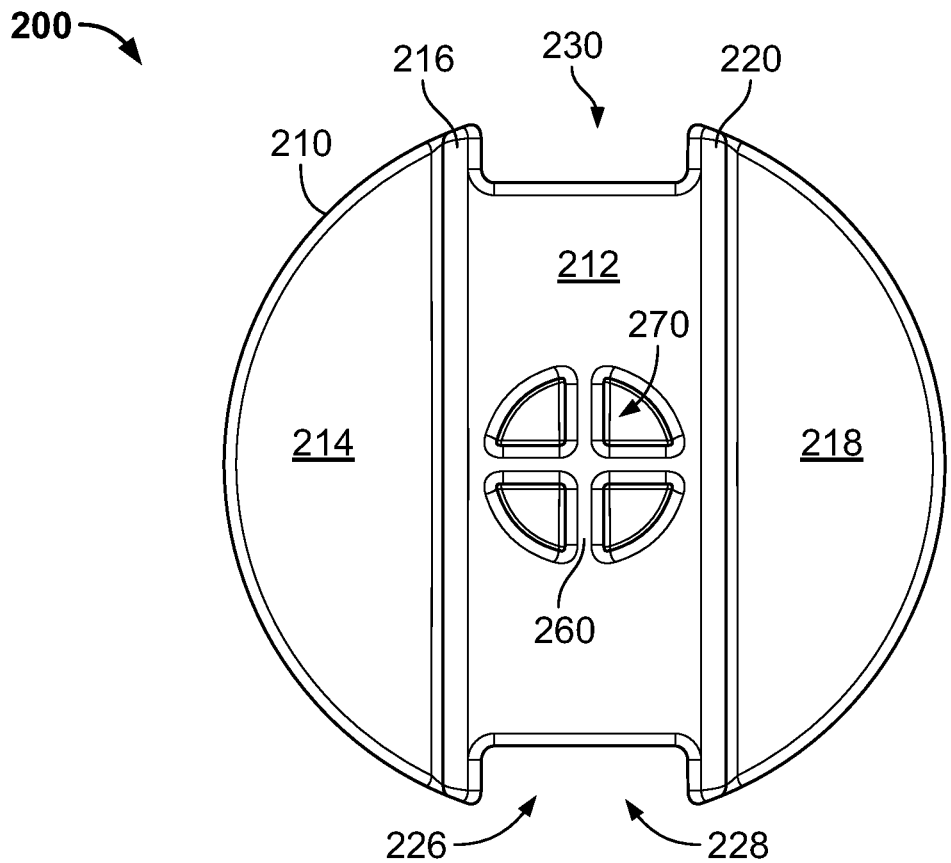
FIG. 2 is a top view of a locking pin of the sealing device of FIG. 1.
Figure 3:
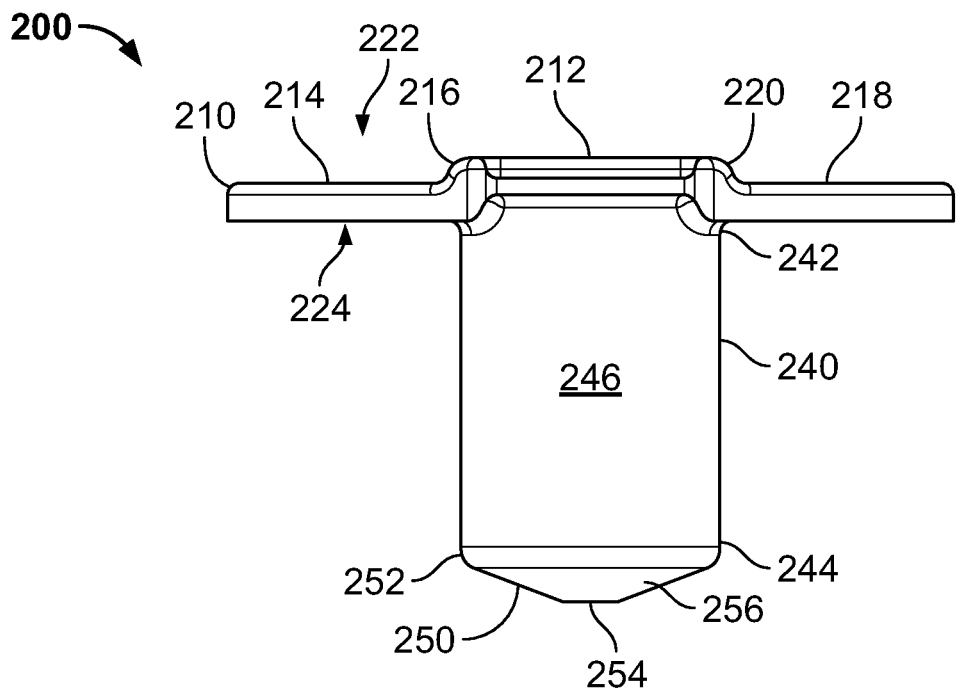
FIG. 3 is a front view of the locking pin of FIG. 2.

As best shown in FIGS. 2 and 3, the locking pin 200 includes: (1) a pin head 210, (2) a pin shaft 240, (3) a pin tip 250, and (4) supporting posts 260. As also best shown in FIG. 9, the locking pin 200 defines a pin bore hole 270 that extends through the pin head 210, through the pin shaft 240, and to the pin tip 250. The pin head 210, the pin shaft 240, the pin tip 250, and the supporting posts 260 of the locking pin 200 are integrally and specifically monolithically suitably formed (such as via molding) of a hard material, such as but not limited to nylon, acetyl, and/or other plastic(s) or combinations thereof. The locking pin 200 is formed via molding and/or other manufacturing process(es) or combination thereof.

The pin head 210 includes: (1) a middle segment 212, (2) a first side segment 214 on one side of the middle segment 212, (3) a first lip 216 extending between and connecting the middle segment 212 and the first side segment 214, (4) a second side segment 218 on another side of the middle segment 212 opposite the first side segment 214, and (5) a second lip 220 extending between and connecting the middle segment 212 and the second side segment 218. Each of the middle segment 212, the first side 214, the first lip 216, the second side 218, and the second lip 220 defines a respective outer surface and a respective opposing under surface. The outer surfaces of the middle segment 212, the first side 214, the first lip 216, the second side 218, and the second lip 220 form an outer side 222 of the pin head 210. The under surfaces of the middle segment 212, the first side 214, the first lip 216, the second side 218, and the second lip 220 form an underside 224 of the pin head 210 that is opposite the outer side 222. The middle segment 212 is elevated with respect to the first and second side segments 214 and 218 via the first and second lips 216 and 220 to define a slot 226 along the underside 224 adjacent the middle segment 212 and between the first and second side segments 214 and 218. The pin head 210 also defines: (1) a first cutout 228 at one end of the middle segment 212, and (2) a second cutout 230 at an opposing end of the middle segment 212.

The pin shaft 240 extends from the underside 224 of the pin head 210. The pin shaft 240 includes: (1) a proximal end 242 extending from the underside 224 of the pin head 210, and (2) a distal end 244 opposite the proximal end 242. The pin shaft 240 defines an outer surface 246 that extends between the proximal end 242 and the distal end 244. The pin shaft 240 has a cylindrical shape and extends along a center axis of the locking pin 200.

The pin tip 250 extends from the distal end 244 of the pin shaft 240. The pin tip 250 includes: (1) a proximal end 252 extending from the distal end 244 of the pin shaft 240, and (2) a distal end 254 opposite the proximal end 252. The pin tip 250 defines an outer surface 256 that has a truncated-cone shape with an outer diameter of the distal end 254 being less than that of the proximal end 252.

Figure 9:
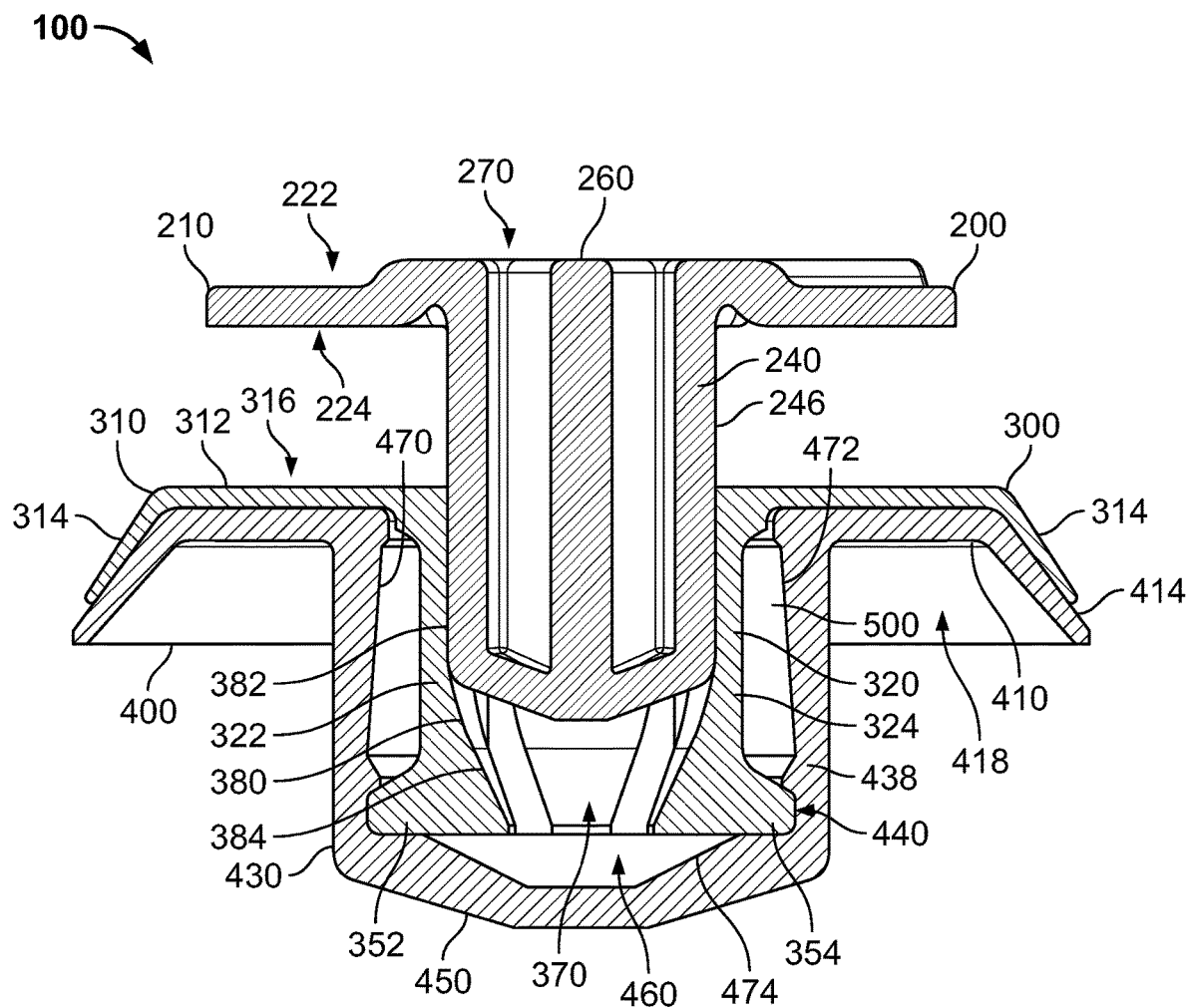
FIG. 9 is a cross-sectional view of the sealing device of FIG. 1 that is partially assembled.

As best shown in FIG. 9, the pin bore hole 270 is defined by the pin head 210, through the pin shaft 240, and to the pin tip 250. The supporting posts 260 include two intersecting posts that extend the depth of the pin bore hole 270 from the pin tip 250 to the pin head 210 to increase rigidity of the locking pin 200. The pin bore hole 270 may be a core out to reduce the amount of material of the locking pin 200. In this illustrated example, the supporting posts 260 include two posts that intersect one another. In other examples, the supporting posts 260 may include more or less posts and/or be arranged in a different pattern with respect to one another.

Figure 4:
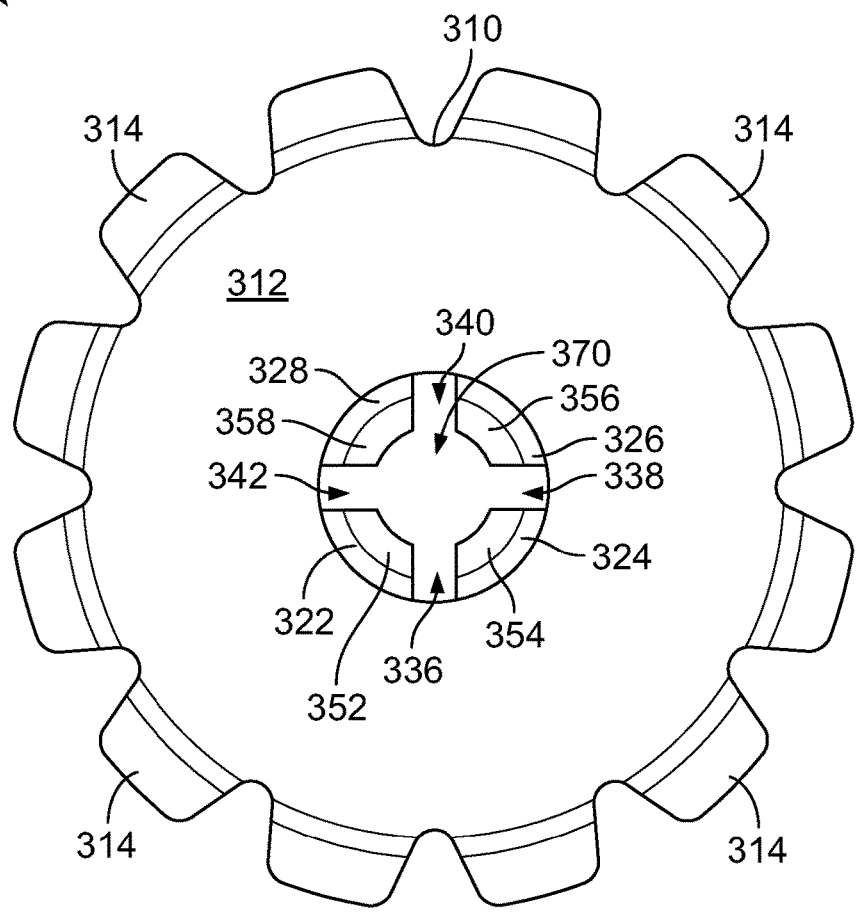
FIG. 4 is a top view of an insert of the sealing device of FIG. 1.
Figure 5:
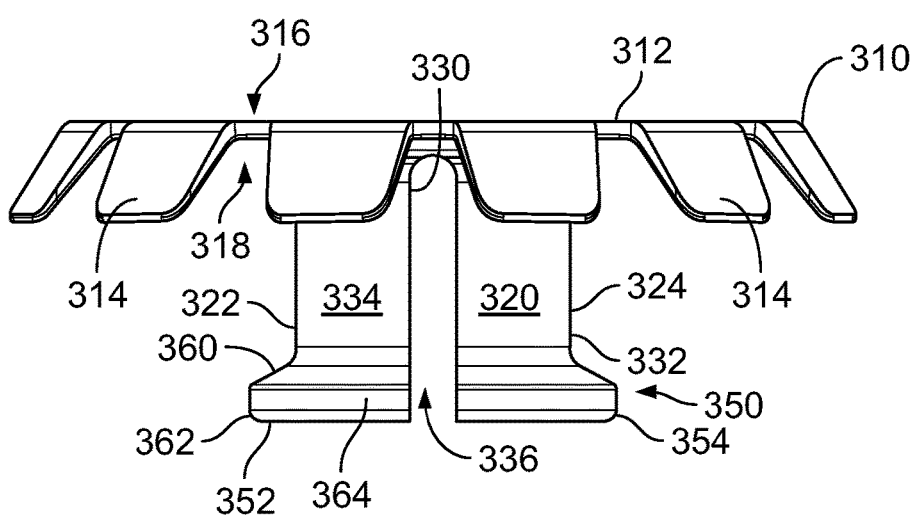
FIG. 5 is a front view of the insert of FIG. 4.

As best shown in FIGS. 4 and 5, the insert 300 includes: (1) an insert head 310, (2) an insert shaft 320, and (3) a plurality of insert feet 350. As best shown in FIG. 9, the insert 300 defines an insert through hole 370 that extends through the insert head 310, the insert shaft 320, and the insert feet 350 along a center axis of the insert 300.

The insert head 310, the insert shaft 320, and the insert feet 350 of the insert 300 are integrally and specifically monolithically suitably formed (such as via molding) of a hard material, such as but not limited to nylon, acetyl, and/or other plastic(s) or combinations thereof. The insert 300 is formed via molding and/or other manufacturing process(es) or combination thereof. In some examples, the insert 300 and the locking pin 200 are molded together and joined together during the molding process via flash-gates. In other examples, the insert 300 and the locking pin 200 are molded separately.

The insert head 310 includes: (1) a insert head plate 312 having a cylindrical shape, and (2) a plurality of spaced apart teeth 314 extending outwardly from an insert outer edge of the insert head plate 312. The insert head plate 312 defines an outer surface and an opposing under surface. Each of the teeth 314 defines an outer surface and an opposing under surface (that functions as a grommet engagement surface as explained below). The outer surfaces of the insert head plate 312 and the teeth 314 form an outer side 316 of the insert head 310. The under surfaces of the insert head plate 312 and the teeth 314 form an underside 318 of the insert head 310 opposite the outer side 316. The teeth 314 extend downwardly at an obtuse angle relative to the insert head plate 312. Each of the teeth 314 are equally sized. Each of the teeth 314 are equidistantly spaced apart from the adjacent ones of the teeth 314.

The insert shaft 320 extends from the underside 318 of the insert head 310. For example, the insert shaft 320 extends from the under surface of the insert head plate 312. The insert shaft 320 includes: (1) a first leg 322, (2) a second leg 324, (3) a third leg 326, and (4) a fourth leg 328. In the illustrated example, the insert shaft 320 includes four legs. In other examples, the insert shaft 320 may include more or less legs.

As best shown in FIGS. 5 and 9, the first leg 322 includes: (1) a proximal end 330 extending from the underside 318 of the insert head 310, and (2) a distal end 332 opposite the proximal end 330. The first leg 322 defines an outer surface 334 extending circumferentially about the center axis of the insert 300.

Each of the second, third, and fourth legs 324, 326, and 328 is similar to the first leg 322, except for its location. Since each of the second, third, and fourth legs 324, 326, and 328 is similar to the first leg 322, only certain aspects of the second, third, and fourth legs 324, 326, and 328 are described in this section for brevity. The features, functions, and alternatives described regarding the first leg 322 thus also apply to the second, third, and fourth legs 324, 326, and 328.

As best shown in FIGS. 4 and 5, the insert shaft 320 has a cylindrical shape that is formed by the legs 322, 324, 326, and 328 in a side-by-side manner about the center axis of the insert 300. The legs 322, 324, 326, and 328 are separated and spaced apart from each other by slits 336, 338, 340, and 342 that extend axially along a length of the insert shaft 320. The legs 322, 324, 326, and 328 are separated from each other by slits 336, 338, 340, and 342 to facilitate the insert shaft 320 in flexing radially outwardly. The slits 336, 338, 340, and 342 include: (1) a first slit 336 between the first leg 322 and the second leg 324, (2) a second slit 338 between the second leg 324 and the third leg 326, (3) a third slit 340 between the third leg 326 and the fourth leg 328, and (4) a fourth slit 342 between the first leg 322 and the fourth leg 328. In the illustrated example, the insert 300 defines four slits. In other examples, the insert 300 may define more or less legs.

The insert feet 350 include: (1) a first foot 352 extending from the distal end 332 of the first leg 322, (2) a second foot 354 extending from the distal end of the second leg 324, (3) a third foot 356 extending from the distal end of the third leg 326, and (4) a fourth foot 358 extending from the distal end of the fourth leg 328. In the illustrated example, the insert feet 350 includes four feet. In other examples, the insert feet 350 may include more or less feet.

The first foot 352 includes: (1) an angled segment 360 extending from the first leg 322, and (2) a base 362 extending from the angled segment 360. The first foot 352 also defines an outer surface 364. The base 362 has a larger outer diameter than that of the first leg 322. The angled segment 360 extends between the first leg 322 and the base 362 such that the outer diameter of the angled segment 360 transitions from that of the first leg 322 to that of the base 362 along the length of the angled segment 360. The first foot 352 extends partially circumferentially about the center axis of the insert 300.

Each of the second, third, and fourth feet 354, 356, and 358 is similar to the first foot 352, except for its location. Since each of the second, third, and fourth feet 354, 356, and 358 is similar to the first foot 352, only certain aspects of the second, third, and fourth feet 354, 356, and 358 are described in this section for brevity. The features, functions, and alternatives described regarding the first foot 352 thus also apply to the second, third, and fourth feet 354, 356, and 358.

As best shown in FIGS. 4 and 5, the slits 336, 338, 340, and 342 continue along a length of the insert feet 350. The first slit 336 extends between the first foot 352 and the second foot 354, the second slit 338 extends between the second foot 354 and the third foot 356, the third slit 340 extends between the third foot 356 and the fourth foot 358, and the fourth slit 342 extends between the first foot 352 and the fourth foot 358.

As best shown in FIG. 9, the insert head 310; the legs 322, 324, 326, and 328 of the insert shaft 320; and the feet 352, 354, 356, and 358 of the insert feet 350 of the insert 300 define inner insert surfaces 380 that defines a shape of the insert through hole 370. The inner insert surfaces 380 extend circumferentially about the center axis of the insert 300 such that the insert through hole 370 has a substantially cylindrical shape. The inner insert surfaces 380 include: (1) upper inner surfaces 382 and (2) lower inner surfaces 384. The upper inner surfaces 382 extend the length of the insert head 310 and a portion of the length the insert shaft 320. The lower inner surfaces 384 extend from the upper inner surface 382, along a remaining portion of the length the insert shaft 320, and the length of the insert feet 350. The upper inner surfaces 382 define a consistent diameter along its length such that the upper inner surfaces 382 form a cylindrical shape. The diameter defined by the lower inner surfaces 384 decreases over the length of the lower inner surfaces 384 such that the lower inner surfaces 384 have a partial conical shape.

Figure 6:
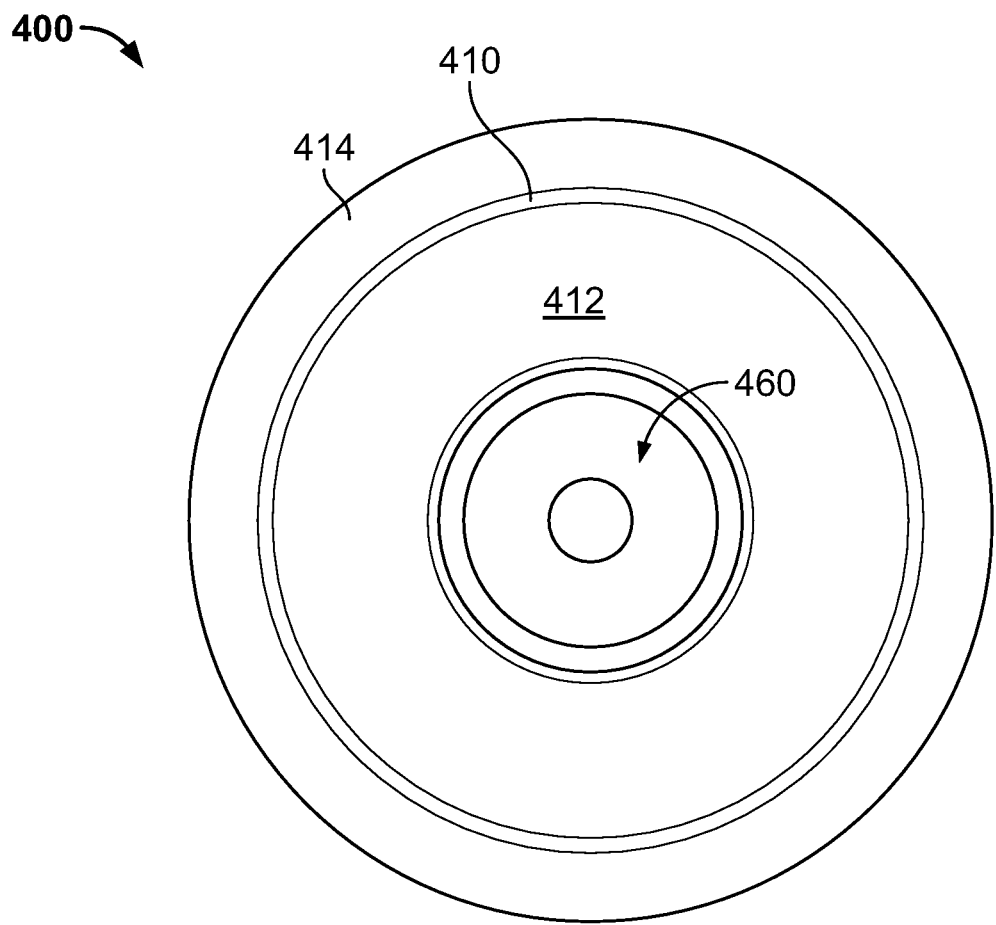
FIG. 6 is a top view of a grommet of the sealing device of FIG. 1.
Figure 7:
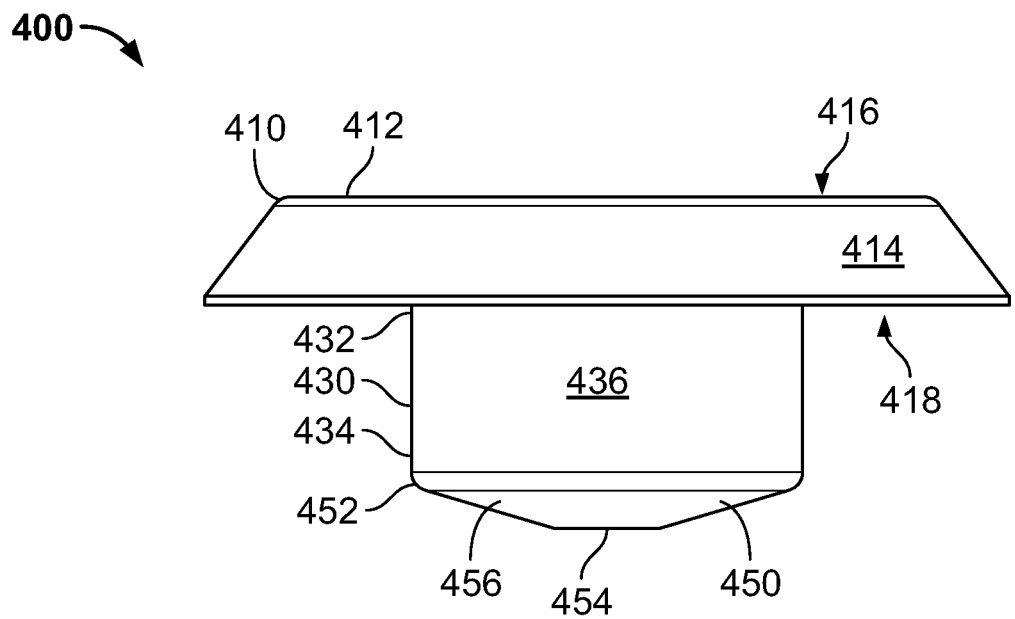
FIG. 7 is a front view of the grommet of FIG. 6.

As best shown in FIGS. 6 and 7, the grommet 400 includes: (1) a grommet head 410, (2) a grommet shaft 430, and (3) a grommet tip 450. As best shown in FIG. 9, the grommet 400 defines a grommet bore hole 460 that extends through the grommet head 410, through the grommet shaft 430, and to the grommet tip 450 along a center axis of the grommet 400. The grommet head 410, the grommet shaft 430, and the grommet tip 450 of the illustrated example sealing device 100 are integrally and specifically monolithically suitably formed (such as via molding) of a flexible material, such as but not limited to thermoplastic elastomer (TPE) and/or other plastic(s) and/or rubber(s) or combinations thereof. The grommet 400 is formed via molding and/or other manufacturing process(es) or combination thereof.

The grommet head 410 includes: (1) a grommet head plate 412, and (2) an outer flange 414 extending from a grommet outer edge of the grommet head plate 412 downwardly at an obtuse angle relative to the grommet head plate 412. The grommet head plate 412 defines an outer surface and an opposing under surface. The outer flange 414 defines an outer surface and an opposing under surface. The outer surfaces of the grommet head plate 412 and the outer flange 414 form an outer side 416 of the grommet head 410. The under surfaces of the grommet head plate 412 and the outer flange 414 form an underside 418 of the grommet head 410 opposite the outer side 416.

The grommet shaft 430 extends from the underside 418 of the grommet head 410. For example, the grommet shaft 430 extends from the under surface of the grommet head plate 412. The grommet shaft 430 includes: (1) a proximal end 432 extending from the underside 418 of the grommet head 410, and (2) a distal end 434 opposite the proximal end 432. The grommet shaft 430 defines an outer surface 436 that extends circumferentially about a center axis of the grommet 400. As best shown in FIG. 9, the grommet shaft 430 also includes an inner lip 438. The inner lip 438 of the grommet shaft 430 and the grommet tip 450 define a feet-receiving groove 440.

The grommet tip 450 extends from the distal end 434 of the grommet shaft 430. The grommet tip 450 includes: (1) a proximal end 452 extending from the distal end 434 of the grommet shaft 430, and (2) a distal end 454 opposite the proximal end 452. The grommet tip 450 defines an outer surface 456 that has a truncated-cone shape with an outer diameter of the distal end 454 being less than that of the proximal end 452.

The grommet head 410, the grommet shaft 430, and the grommet tip 450 of the grommet 400 form an inner surface 470 that defines a shape of the grommet bore hole 460. The inner grommet surface 470 extends circumferentially about the center axis of the grommet 400 such that the grommet bore hole 460 has a substantially cylindrical shape. As best shown in FIG. 9, the inner grommet surface 470 includes: (1) an upper inner surface 472 that extends from the grommet head 410 and along a portion of the grommet shaft 430; and (2) a lower inner surface 474 extending from the upper inner surface 472, along the inner lip 438, and to an inner end the grommet tip 450. The upper inner surface 472 expands outwardly with an increasing diameter along its length from the grommet head 410 to the lower inner surface 474. The lower inner surface 474 contracts with a decreasing diameter along its length from the upper inner surface 472 to the inner end of the grommet tip 450. The inner lip 438 is positioned between the upper inner surface 472 and the feet-receiving groove 440 and defines a portion of the lower inner surface 474 that is adjacent the upper inner surface 472.

The locking pin 200, the insert 300, and the grommet 400 are configured to be assembled together to form the sealing device 100. To assemble the sealing device 100, (1) the pin shaft 240 and the pin tip 250 of the locking tip 200 are inserted into the insert 300 through hole 370 of the insert 300 and (2) the insert shaft 320 and the insert feet 350 of the insert 300 are inserted into the grommet bore hole 460 of the grommet 400.

Initially, the locking pin 200 and the insert 300 are assembled together into a pre-driven configuration of the sealing device 100. In the pre-driven configuration, the pin shaft 240 of the locking pin 200 is pushed or pressed partially into the insert through hole 370 of the insert 300. The pin shaft 240 of the locking pin 200 partially extends into the insert through hole 370 to the extent that (1) the upper inner surface 382 of the insert 300 engages the outer surface 246 of the pin shaft 200 and (2) the lower inner surface 384 of the insert 300 does not engage the outer surface 246 of the pin shaft 200. The pin shaft 240 has an outer diameter that is equal or greater than an inner diameter of the upper inner surface 382 of the insert 300 to enable the locking pin 200 to remain partially inserted into the insert through hole 370 via a press fit. Pushing the locking pin 200 into the insert 300 in the pre-driven configuration may break any flash-gate fragments remaining from the molding process of the locking pin 200 and/or the insert 300.

Figure 8:
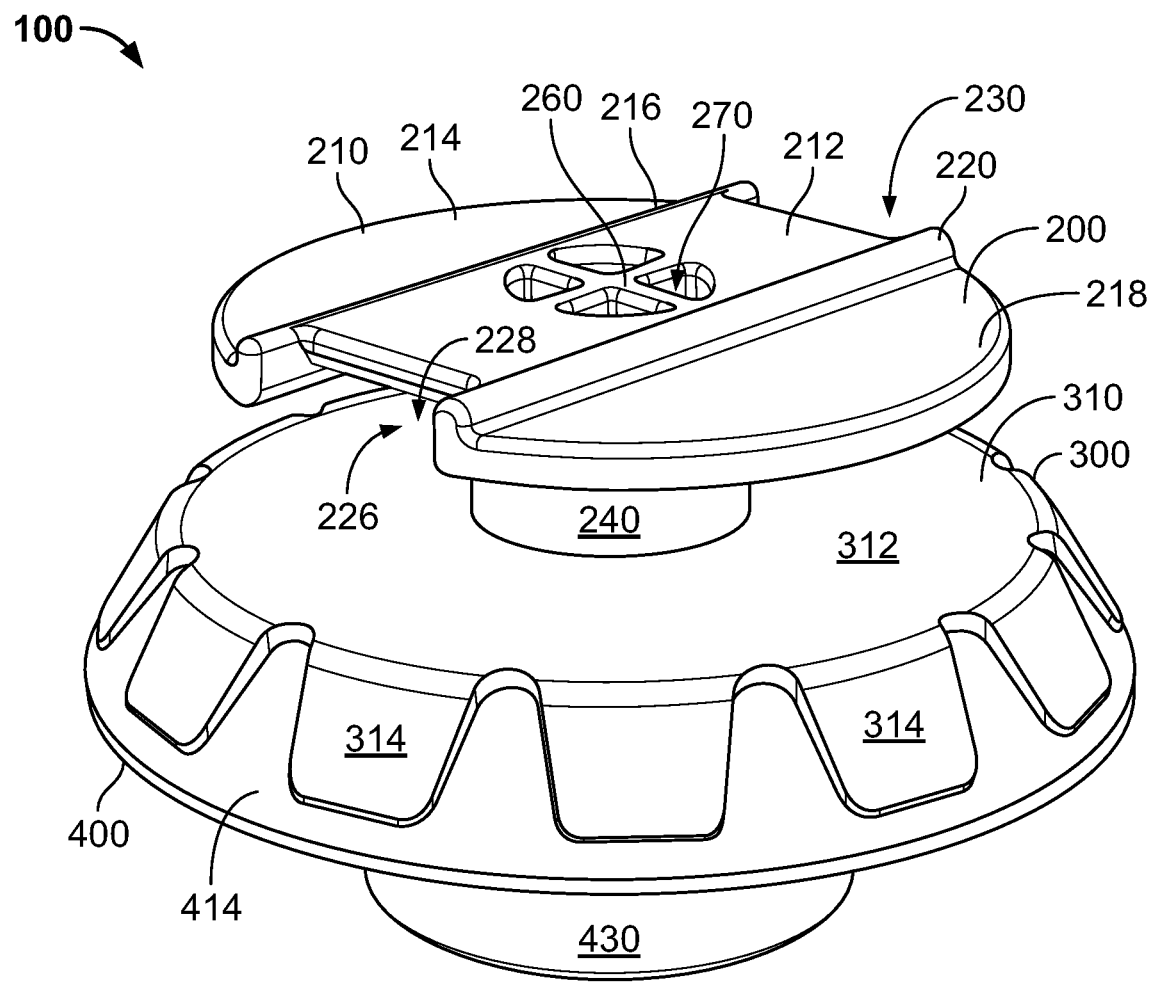
FIG. 8 is a perspective view of the sealing device of FIG. 1 that is partially assembled.

Subsequently, the locking pin 200, the insert 300, and the grommet 400 of the sealing device 100 are assembled into an as-shipped configuration best shown in FIGS. 8 and 9. The sealing device 100 is shipped to a customer in the as-shipped configuration to reduce assembly time of the customer and, thus, enable the sealing device 100 to be quickly and easily installed by the customer. In alternative embodiments, the sealing device 100 can be shipped to a customer in an unassembled manner or other suitable partially assembled manner.

In the as-shipped configuration, (1) the pin shaft 240 of the locking pin 200 remains partially inserted into the insert through hole 370 of the insert 300 in the as-shipped configuration and (2) the insert shaft 320 and the insert feet 350 of the insert 300 are inserted fully into the grommet bore hole 460 of the grommet 400. When the insert shaft 320 and the insert feet 350 are inserted fully into the grommet bore hole 460, (1) the insert feet 350 are received by the feet-receiving groove 440, (2) the inner lip 438 engages the insert feet 350 to retain the insert feet 350 within the feet-receiving groove 440, (3) an air gap 500 is formed between the insert shaft 320 and the grommet shaft 430, (4) the under surface of the insert head plate 312 engages the outer surface of the grommet head plate 412, and (5) the under surface of each of the teeth 314 engages a portion of the outer surface of the outer flange 414. The air gap 500 is defined by the outer surfaces 334 of the insert shaft 320; the outer surfaces 364 of the feet 352, 354, 356, and 358; the upper inner surface 472 of the grommet 400, and a portion of the lower inner surface 474 of the grommet 400. The teeth 314 of the insert 300 engage the outer flange 414 of the grommet 400 to provide structural support to the outer flange 414 without preventing the outer flange 414 from flexing.

In the illustrated example, the grommet bore hole 460 has a cylindrical shape to securely receive the insert shaft 320 that has a cylindrical shape, and the insert through hole 370 has a cylindrical shape to securely receive the pin shaft 240 that has a cylindrical shape. In other examples, the grommet bore hole 460 and the insert shaft 320 may have any other shape (such as oval, rectangular, etc.) that enables the grommet bore hole 460 to securely receive the insert shaft 320. The insert through hole 370 and the pin shaft 240 may have any other shape (such as oval, rectangular, etc.) that enables the insert through hole 370 to securely receive the pin shaft 240.

As best shown in FIGS. 10, 11, 12, 13, 14, and 15, the sealing device 100 is usable as a plug to sealingly and securely plug any one of a plurality of differently-sized and -shaped holes. For example, the sealing device 100 is capable of plugging holes of various depths, diameters, shapes, edge deformities (such as dents and/or disruptions), etc. When used as a plug, the sealing device 100 is inserted into an object hole of an object (such as a panel) and forms a sealed connection with one or more surfaces of the object, such as a first object surface and an opposing second object surface, adjacent the hole. For example, the sealing device 100 may be used to plug a hole in the assembly of a vehicle. It should be appreciated that the sealing device 100 of the present disclosure is not limited to use in the assembly of a vehicle.

Figure 10:
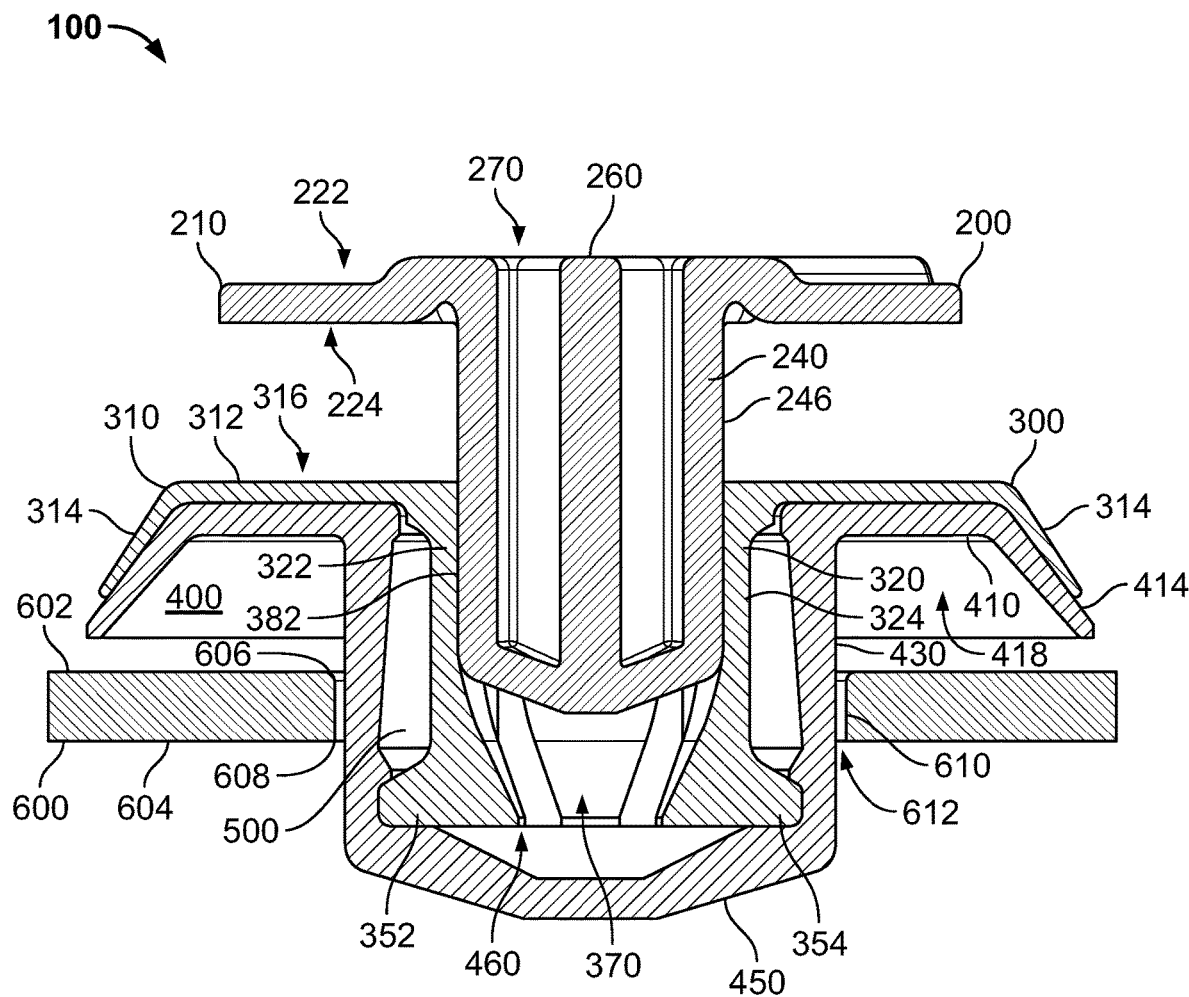
FIG. 10 is a cross-sectional view of the sealing device of FIG. 1 that is partially assembled and inserted into a hole of a panel.
Figure 11:
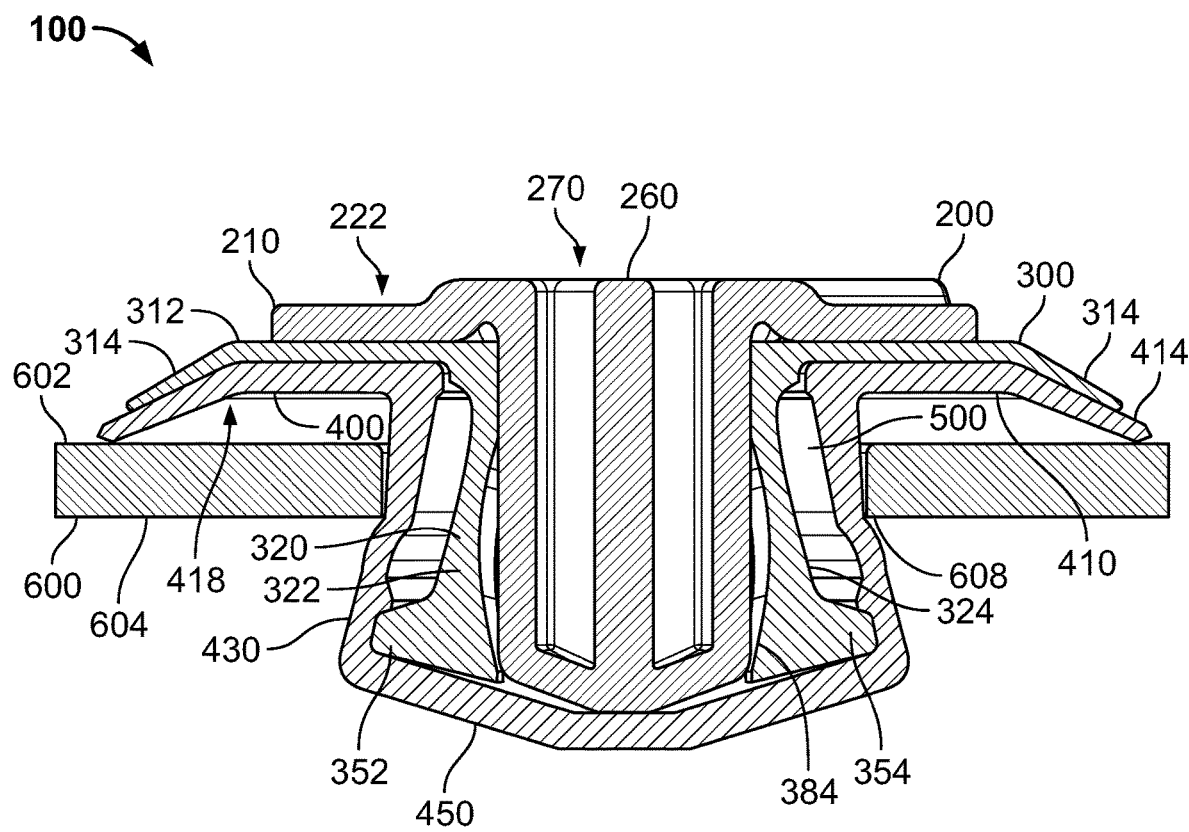
FIG. 11 is a cross-sectional view of the sealing device of FIG. 1 that is fully assembled and fastened to the panel to seal the hole of FIG. 10.

As best shown in FIGS. 10 and 11, the sealing device 100 is capable of operating as a plug that sealingly and securely couples to an example panel 600, creating a secure seal. The panel 600 defines: (1) a first surface 602, (2) a second surface 604 opposite the first surface 602, (3) a first edge 606 adjacent the first surface 602, (4) a second edge 608 adjacent the second surface 604 and opposite the first edge 606, and (5) an inner hole surface 610 that extends between the first edge 606 and the second edge 608. The first surface 602 forms a first side of the panel 600. The second surface 604 forms a second side of the panel 600 that is opposite the first side. The inner hole surface 610 of the panel 600 defines a hole 612 that extends between the first edge 606 and the second edge 608. The panel 600 is substantially flat without any dents, disruptions, and/or any other edge deformities adjacent the hole 612.

In FIG. 10, the sealing device 100 is in the as-shipped configuration. The sealing device 100 is inserted into the hole 612 from the first side of the panel 600 to extend partially to the second side of the panel. When the sealing device 100 is inserted into the hole 612, (1) portions of the pin tip 250, the insert shaft 320, and the grommet shaft 430 are disposed within the hole 612; (2) the insert feet 350 and the grommet tip 450 extend beyond the hole 612 to the second side of the panel 600; and (3) the pin head 210, the insert head 310, and the grommet head 410 remain on the first side of the panel 600. The hole 612 has a diameter that is greater than the outer diameter of the grommet shaft 430 such that a clearance gap is formed between the inner hole surface 610 and the grommet shaft 430. Each of the insert head 310 and the grommet head 410 has an outer diameter that is greater than the inner diameter of the hole 612 to prevent the sealing device 100 from traveling completely through the hole 612.

In FIG. 11, the sealing device 100 is in an installed configuration that plugs the hole 612 of the panel 600. To install and retain the sealing device 100 within the hole 612 of the panel 600, (1) the sealing device 100 is positioned through the hole 612 and relative to the panel 600 such that the outer flange 414 of the grommet 400 engages the first surface 602 of the panel 600 and (2) the locking pin 200 is completely driven into the insert through hole 370 of the insert 300.

As the locking pin 200 is driven into the insert through hole 370, (1) the outer surface 246 of the pin shaft 240 engages the lower inner surfaces 384 of the insert shaft 320; (2) the pin shaft 240 causes the legs 322, 324, 326, and 328 to flex outwardly due to the pin shaft 240 having an outer diameter that is greater than an inner diameter of the insert shaft 320 in a resting position; (3) the feet 352, 354, 356, and 358 extending from the respective legs 322, 324, 326, and 328 push and expand the grommet shaft 430 radially outwardly; (4) the grommet shaft 430 subsequently engages the second edge 608 and a portion of the inner hole surface 610 of the panel 600; and (5) the outer surfaces of the insert head plate 312 engage the under surfaces of the pin head 210. The insert head plate 312 engages the pin head 210 to prevent the pin head 210 from being driven entirely through the insert through hole 370.

In the installed configuration, (1) the outer flange 414 of the grommet 400 engages the first surface 602 to form a first seal on the first side of the panel 600 and (2) the grommet shaft 430 engages the second edge 608 to form a second seal on the second side of the panel 600. Each of the feet 352, 354, 356, and 358 of the insert feet 350 are secured in place by the inner lip 438 of the grommet shaft 430 when received by the feet-receiving groove 440 to secure the position of the insert 300 relative to that of the grommet 400 in the installed configuration. The teeth 314 of the insert 300 provide structural support to the outer flange 414 to facilitate formation of the first seal between the outer flange 414 and the first surface 602 by inhibiting flexing of the outer flange 414 away from the first surface 602. The outer flange 414 may compress against the first surface 602 as the pin shaft 240 is inserted into the insert shaft 320 and the pin head 210 pushes the insert head 310 and the grommet head 410 toward the panel 600. The air gap 500 located between the insert shaft 320 and the grommet shaft 430 enables the grommet shaft 430 to flex outwardly and conform to second edge 608 and the inner hole surface 610 to form the second seal on the second side of the panel 600.

To remove the sealing device 100 in the installed configuration from the hole 612, (1) the pin shaft 240 of the locking pin 200 is pulled out of the insert through hole 370 of the insert 300 in a direction toward the first side of the panel 600 and (2) the insert 300 and the grommet 400 are subsequently extracted from the hole 612. The locking pin 200 may be pulled out of the insert through hole 370 using a tool. The slot 226 of the pin head 210 enables the tool (such as a flathead screwdriver) to be inserted in between the pin head 210 and insert head 310 when the sealing device 100 is in the installed configuration. The first cutout 228 and/or the second cutout 230 facilitates insertion of the tool between the pin head 210 and insert head 310. The tool may then apply mechanical leverage to the underside of the pin head 210 to pull the locking pin 200 out of the insert through hole 370.

In some examples, the locking pin 200 and the insert 300 includes a snap-fit assembly to facilitate retention of the locking pin 200 within the insert 300 in the installed configuration. For example, the pin shaft 240 and/or the pin tip 250 of the locking pin 200 includes snap-fit flange(s), and the insert feet 350 of the insert 300 defines corresponding snap-fit groove(s). The snap-fit groove(s) receive the snap-fit flange(s) when the locking pin 200 is fully driven into the insert through hole 370 of the insert 300 to inhibit subsequent removal of the locking pin 200 from the insert through hole 370.

Figure 12:
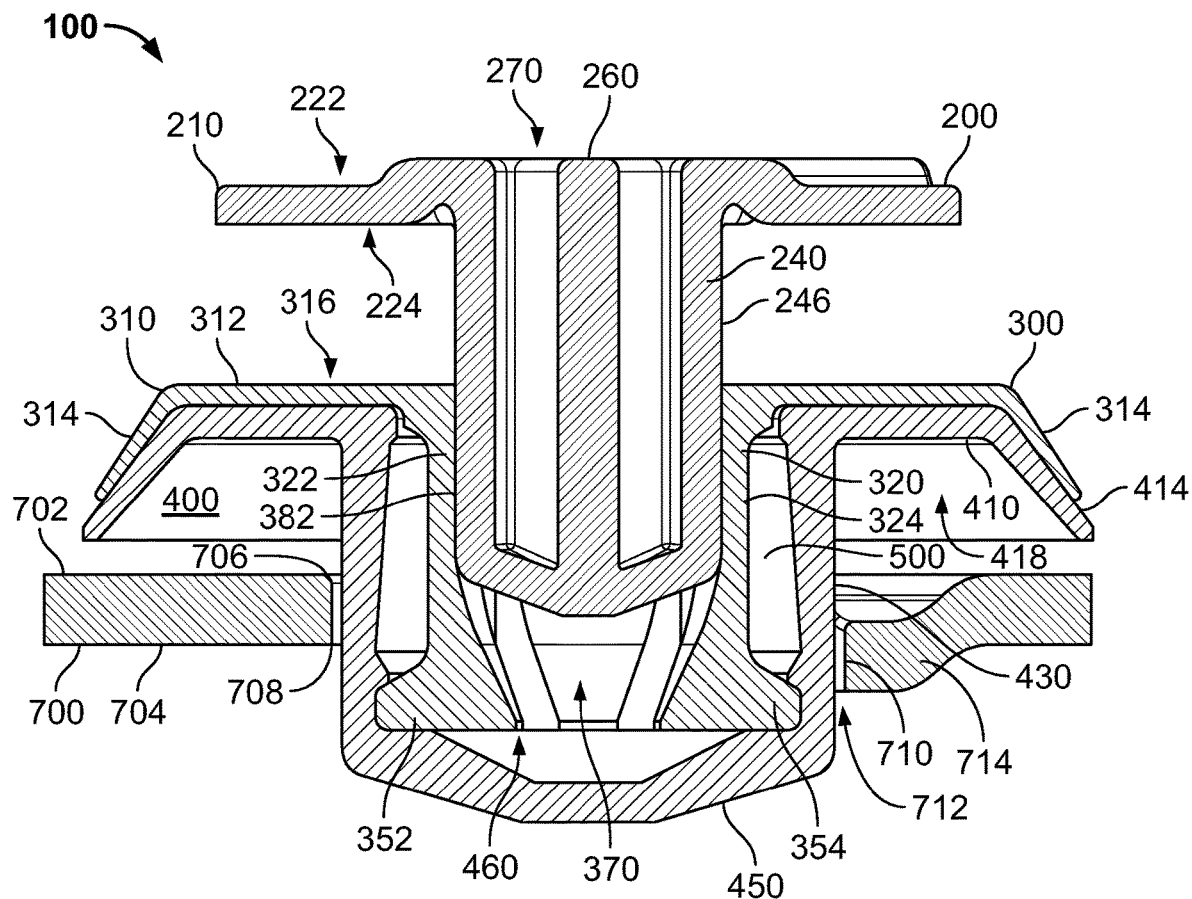
FIG. 12 is a cross-sectional view of the sealing device of FIG. 1 that is partially assembled and inserted into a downwardly-deformed hole of a panel.
Figure 13:
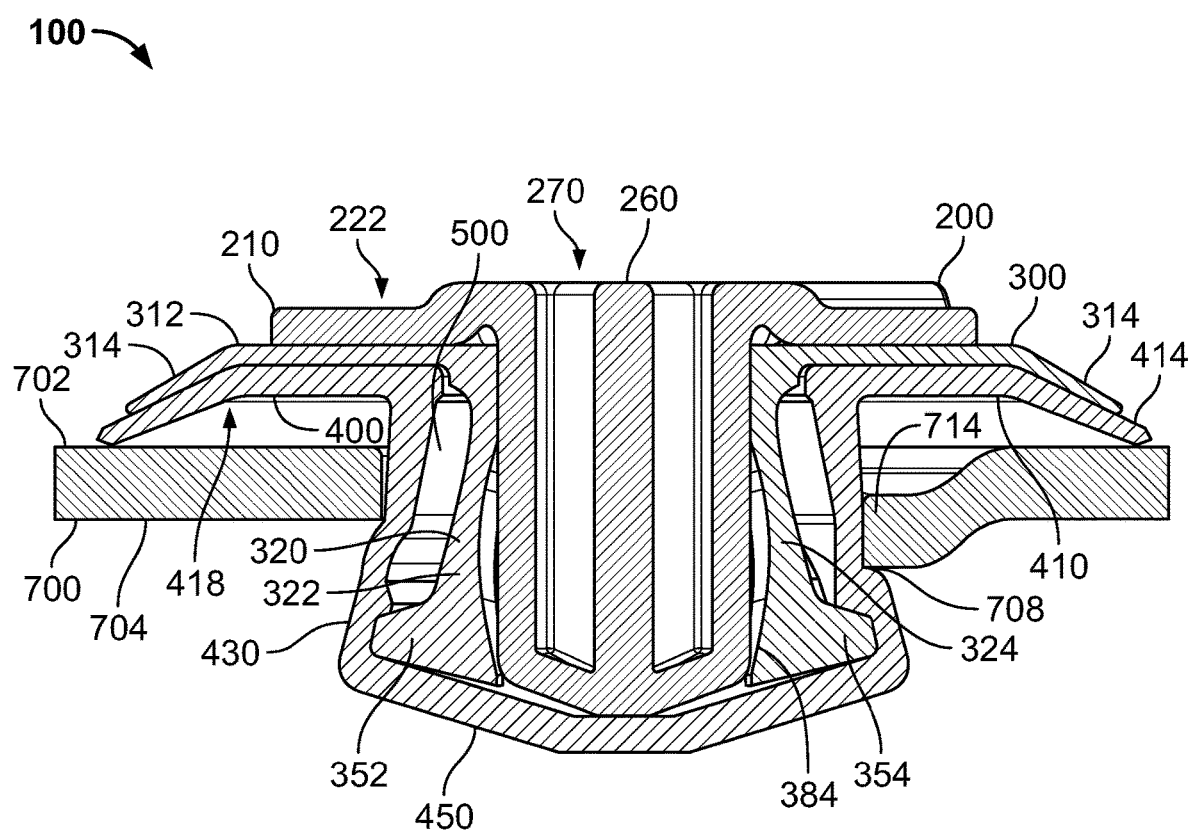
FIG. 13 is a cross-sectional view of the sealing device of FIG. 1 that is fully assembled and fastened to the panel to seal the hole of FIG. 12.

As best shown in FIGS. 12 and 13, the sealing device 100 is capable of operating as a plug that sealingly and securely couples to another example panel 700, creating a secure seal. The panel 700 defines: (1) a first surface 702, (2) a second surface 704 opposite the first surface 702, (3) a first edge 706 adjacent the first surface 702, (4) a second edge 708 adjacent the second surface 704 and opposite the first edge 706, and (5) an inner hole surface 710 that extends between the first edge 706 and the second edge 708. The first surface 702 forms a first side of the panel 700. The second surface 704 forms a second side of the panel 700 that is opposite the first side. The inner hole surface 710 of the panel 700 defines a hole 712 that extends between the first edge 706 and the second edge 708. The panel 700 includes a deformity 714 (such as a bump) adjacent the hole 712 that has pushed a portion of the first edge 706, the second edge 708, and the inner hole surface 710 in a direction toward the second side of the panel 700.

In FIG. 12, the sealing device 100 is inserted into the hole 712 of the panel 700 in the as-shipped configuration in a manner similar to that of the sealing device 100 being inserted into the hole 612 of the panel 600 of FIG. 10. Since the insertion of the sealing device 100 into the hole 712 is similar to the insertion of the sealing device 100 into the hole 612, only certain aspects of the sealing device 100 into the hole 712 are described in this section for brevity. The features, functions, and alternatives described regarding the insertion of the sealing device 100 into the hole 612 thus also apply to the insertion of the sealing device 100 into the hole 712.

In FIG. 13, the sealing device 100 is in an installed configuration that plugs the hole 712 of the panel 700 in a manner similar to that of the installed configuration of the sealing device 100 FIG. 10. Since the installed configuration of the sealing device 100 within the hole 712 is similar to the installed configuration of the sealing device 100 within the hole 612, only certain aspects of the installed configuration of the sealing device 100 within the hole 712 are described in this section for brevity. The features, functions, and alternatives described regarding the installed configuration of the sealing device 100 within the hole 612 thus also apply to the installed configuration of the sealing device 100 within the hole 712.

In the installed configuration of the sealing device 100 shown in FIG. 13, (1) the outer flange 414 of the grommet 400 engages the first surface 702 to form a first seal on the first side of the panel 700 and (2) the grommet shaft 430 engages the second edge 708 to form a second seal on the second side of the panel 700. The insert head 310 and the grommet head 410 extend radially over and beyond the deformity 714 to enable the outer flange 414 of the grommet 400 to form the first seal with a portion of the first surface 702 that is spaced apart from the deformity 714. The air gap 500 located between the insert shaft 320 and the grommet shaft 430 enables the grommet shaft 430 to flex outwardly and conform to the second edge 708 and the inner hole surface 710, including portions of the deformity 714, to form the second seal on the second side of the panel 700.

Figure 14:
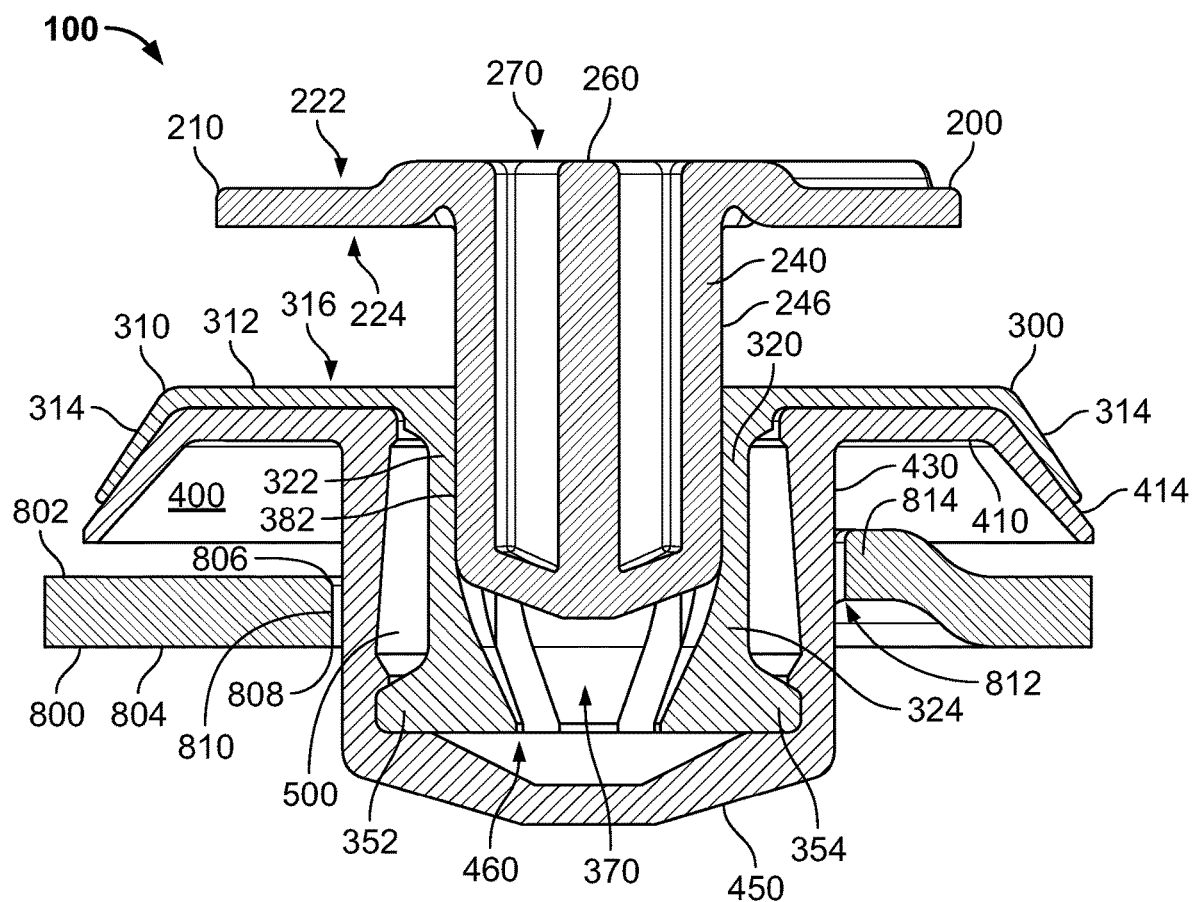
FIG. 14 is a cross-sectional view of the sealing device of FIG. 1 that is partially assembled and inserted into an upwardly-deformed hole of a panel.
Figure 15:
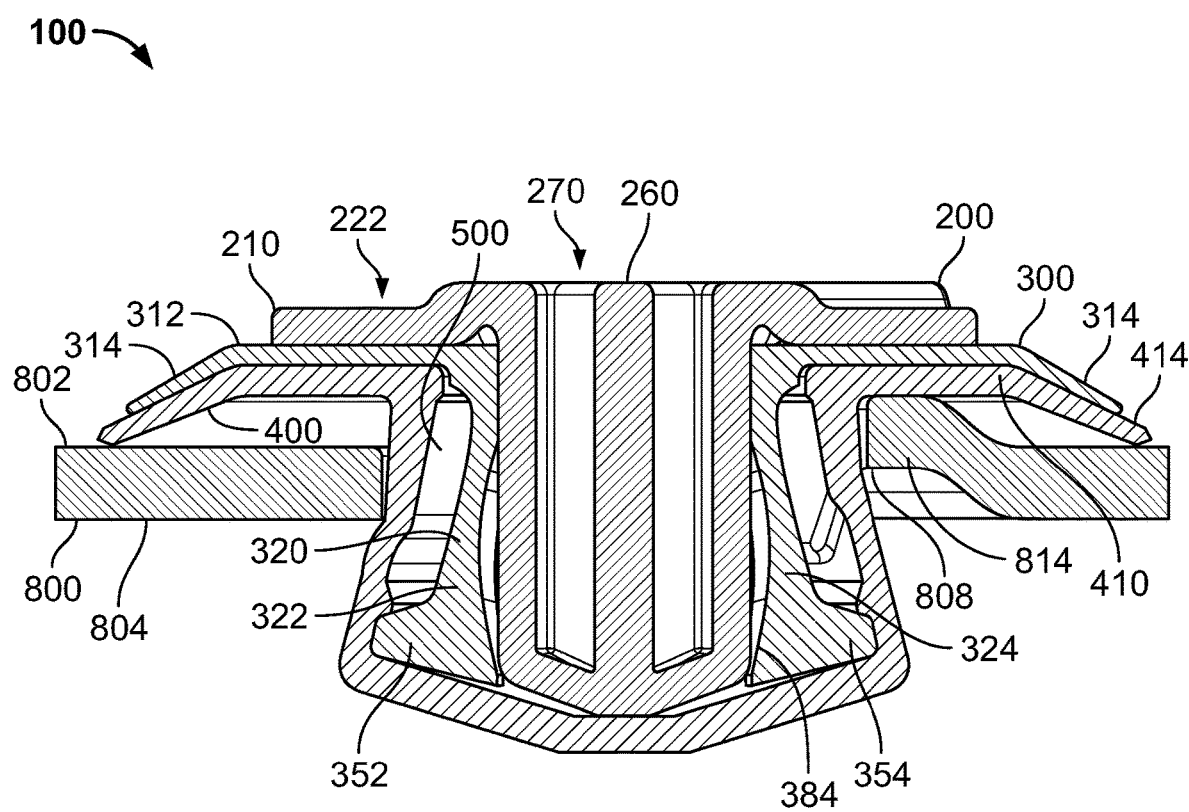
FIG. 15 is a cross-sectional view of the sealing device of FIG. 1 that is fully assembled and fastened to the panel to seal the hole of FIG. 14.

As best shown in FIGS. 14 and 15, the sealing device 100 is capable of operating as a plug that securely and sealingly couples to another example panel 800, creating a secure seal. The panel 800 defines: (1) a first surface 802, (2) a second surface 804 opposite the first surface 802, (3) a first edge 806 adjacent the first surface 802, (4) a second edge 808 adjacent the second surface 804 and opposite the first edge 806, and (5) an inner hole surface 810 that extends between the first edge 806 and the second edge 808. The first surface 802 forms a first side of the panel 800. The second surface 804 forms a second side of the panel 800 that is opposite the first side. The inner hole surface 810 of the panel 800 defines a hole 812 that extends between the first edge 806 and the second edge 808. The panel 800 includes a deformity 814 (such as a bump) adjacent the hole 812 that has pushed a portion of the first edge 806, the second edge 808, and the inner hole surface 810 in a direction toward the first side of the panel 700.

In FIG. 14, the sealing device 100 is inserted into the hole 812 of the panel 800 in the as-shipped configuration in a manner similar to that of the sealing device 100 being inserted into the hole 612 of the panel 600 of FIG. 10. Since the insertion of the sealing device 100 into the hole 812 is similar to the insertion of the sealing device 100 into the hole 612, only certain aspects of the sealing device 100 into the hole 812 are described in this section for brevity. The features, functions, and alternatives described regarding the insertion of the sealing device 100 into the hole 812 thus also apply to the insertion of the sealing device 100 into the hole 812.

In FIG. 15, the sealing device 100 is in an installed configuration that plugs the hole 812 of the panel 800 in a manner similar to that of the installed configuration of the sealing device 100 FIG. 10. Since the installed configuration of the sealing device 100 within the hole 812 is similar to the installed configuration of the sealing device 100 within the hole 812, only certain aspects of the installed configuration of the sealing device 100 within the hole 812 are described in this section for brevity. The features, functions, and alternatives described regarding the installed configuration of the sealing device 100 within the hole 812 thus also apply to the installed configuration of the sealing device 100 within the hole 812.

In the installed configuration of the sealing device 100 shown in FIG. 15, (1) the outer flange 414 of the grommet 400 engages the first surface 802 to form a first seal on the first side of the panel 800 and (2) the grommet shaft 430 engages the second edge 808 to form a second seal on the second side of the panel 800. The insert head 310 and the grommet head 410 extend radially over and beyond the deformity 814 to enable the outer flange 414 of the grommet 400 to form the first seal with a portion of the first surface 802 that is spaced apart from the deformity 814. The air gap 500 located between the insert shaft 320 and the grommet shaft 430 enables the grommet shaft 430 to flex outwardly and conform to the second edge 808 and the inner hole surface 810, including portions of the deformity 814, to form the second seal on the second side of the panel 800.

Additionally, the sealing device 100 is usable as a sealing fastener. For example, the sealing device 100 is capable of being inserted into an object hole formed from two or more aligned holes of two or more respective objects (such as panels) to (1) couple the objects together and (2) form a seal connection with one or more surfaces of the coupled objects (such as a first object surface and an opposing second object surface). The sealing device 100 may be inserted into holes of various depths, diameters, shapes, edge deformities (such as dents and/or disruptions), etc. to couple the objects together. The sealing device 100 may be used to fasten two or more objects together for the assembly of a vehicle. It should be appreciated that the sealing device 100 of the present disclosure is not limited to use in the assembly of a vehicle.

To install the sealing device 100 into aligned holes of respective objects, (1) the sealing device 100 is positioned through the holes such that the outer flange 414 of the grommet 400 engages a first surface of one of the objects and (2) the locking pin 200 is completely driven into the insert through hole 370 of the insert 300.

As the locking pin 200 is driven into the insert through hole 370, (1) the outer surface 246 of the pin shaft 240 engages the lower inner surfaces 384 of the insert shaft 320; (2) the pin shaft 240 causes the legs 322, 324, 326, and 328 to flex outwardly due to the pin shaft 240 having an outer diameter that is greater than an inner diameter of the insert shaft 320 in a resting position; (3) the feet 352, 354, 356, and 358 extending from the respective legs 322, 324, 326, and 328 push and expand the grommet shaft 430 radially outwardly; (4) the grommet shaft 430 subsequently engages an opposing second surface of one of the objects; and (5) the outer surfaces of the insert head plate 312 engage the under surfaces of the pin head 210.

The outer flange 414 of the grommet 400 engages the first surface of one of the fastened objects to form a first seal. The teeth 314 of the insert 300 provide structural support to the outer flange 414 to facilitate formation of the first seal between the outer flange 414 and the first surface. The grommet shaft 430 engages the edge of the opposing second surface to form a second seal. The air gap 500 located between the insert shaft 320 and the grommet shaft 430 enables the grommet shaft 430 to flex outwardly and conform to second edge 608 and the inner hole surface 610 to form the opposing second seal.

Figure 16:
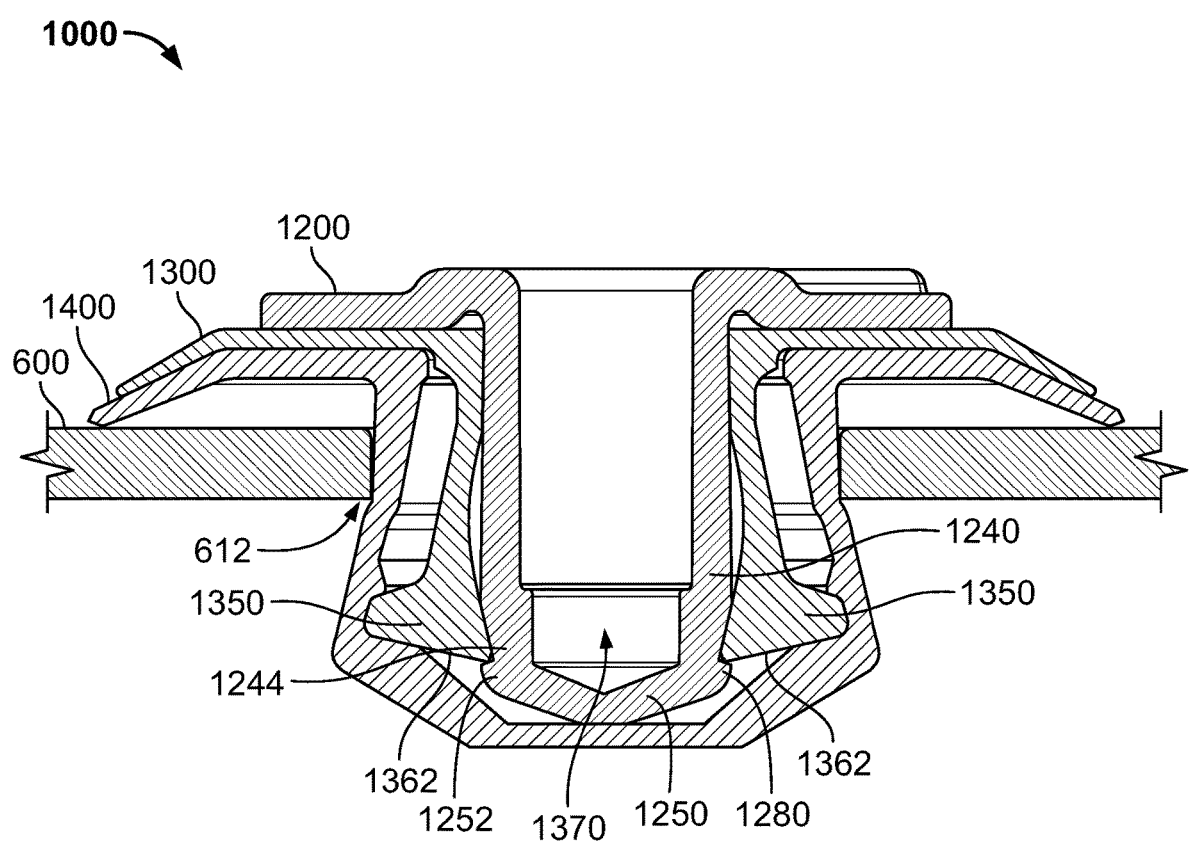
FIG. 16 is a cross-sectional view of an example sealing device of another embodiment of the present disclosure that is fully assembled and fastened to a panel to seal a hole.

FIG. 16 depicts another example embodiment of a sealing device 1000 of the present disclosure when positioned through the hole 612 of the panel 600 in the installed configuration. The sealing device 1000 includes: (1) a locking pin 1200, (2) an insert 1300, and (3) a grommet 1400. Each of the locking pin 1200, the insert 1300, and the grommet 1400 of the sealing device 1000 is similar to the respective locking pin 200, insert 300, and grommet 400 of the sealing device 100. Thus, only certain aspects of the locking pin 1200, the insert 1300, and the grommet 1400 are described in this section for brevity. The features, functions, and alternatives described regarding the locking pin 200, the insert 300, and the grommet 400 of the sealing device 100 thus also apply to the locking pin 1200, the insert 1300, and the grommet 1400 of the sealing device 1000.

In FIG. 16, a pin shaft 1240 of the locking pin 1200 includes a snap-fit flange 1280 that is located adjacent a distal end 1244 of the pin shaft 1240 and/or a proximal end 1252 of a pin tip 1250. The snap-fit flange 1280 forms a snap-fit assembly with respective bases 1362 of feet 1350 of the insert 1300 to facilitate retention of the locking pin 1200 within the insert 1300 in the installed configuration. The snap-fit flange 1280 engages and is received by the bases 1362 of the feet 1350 when the locking pin 1200 is fully driven into the insert through hole 1370 of the insert 1300 to inhibit subsequent removal of the locking pin 1200 from an insert through hole 1370 of the insert 1300.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A sealing device comprising:
   a grommet formed of flexible material and including:
      a grommet shaft insertable into an object hole defined by one or more objects; and
      a grommet head;
      the grommet defining a grommet bore hole extending through the grommet head and the grommet shaft;
   an insert including an insert shaft and a plurality of feet, the insert shaft insertable into the grommet bore hole, the insert defining an insert through hole extending through the insert shaft, the insert shaft including a plurality of legs that are separated from each other to facilitate the insert shaft in flexing radially outward, each of the plurality of feet extending from an end of a respective one of the plurality of legs; and
   a locking pin including a pin shaft drivable into the insert through hole to retain the grommet shaft within the object hole,
   wherein the plurality of feet are configured to push the grommet shaft to flex radially outwardly as the locking pin is driven into the insert through hole to cause the grommet shaft to flex and sealingly engage a flat or deformed edge that extends along an object surface to form a seal on a side of the one or more objects.

2. The sealing device of claim 1, wherein the grommet head includes:
   a grommet head plate defining a grommet outer edge and a grommet under surface, the grommet shaft extending from the grommet under surface of the grommet head plate; and
   an outer flange extending from the grommet outer edge of the grommet head plate, the outer flange engageable with an other object surface to form an other seal on an other side of the one or more objects.

3. The sealing device of claim 2, wherein the outer flange of the grommet head extends at an obtuse angle relative to the grommet head plate.

4. The sealing device of claim 2, wherein the grommet head extends radially outwardly from a center axis of the grommet to enable the outer flange to engage a portion of the other object surface that is located away from the object hole at which a deformity is formed.

5. The sealing device of claim 2, wherein the insert includes:
   an insert head plate defining an insert outer edge, the insert shaft extending from the insert head plate; and
   a plurality of teeth extending from the insert outer edge of the insert head plate, each of the plurality of teeth engageable with the outer flange of the grommet to provide structural support to the outer flange without preventing the outer flange from flexing.

6. The sealing device of claim 2, wherein the insert includes an insert head plate from which the insert shaft extends, the insert head plate being engageable with the grommet head plate when the insert shaft has been inserted into the grommet bore hole.

7. The sealing device of claim 6, wherein the locking pin includes a pin head from which the pin shaft extends, the pin head being engageable with the insert head plate when the pin shaft has been driven into the insert through hole.

8. The sealing device of claim 7, wherein the pin head includes:
   a middle segment;
   a first side segment on one side of the middle segment; and
   a second side segment on another side of the middle segment opposite the first side segment;
   the middle segment being elevated with respect to the first and second side segments to define a slot along an underside of the pin head and in which a tool is insertable to pull the locking pin out of the insert through hole.

9. The sealing device of claim 1, wherein the grommet defines a feet-receiving groove that is configured to receive the plurality of feet when the insert shaft is inserted into the grommet bore hole.

10. The sealing device of claim 1, wherein the plurality of legs that are separated from each other by slits extending axially along a length of the insert shaft.

11. The sealing device of claim 1, wherein each of the plurality of feet include:

an angled segment extending from a respective one of the plurality of legs; and a base extending from the angled segment 360, the base having an outer diameter that is larger than that of the respective one of the plurality of legs;

wherein the angled segment extends between the base and the respective one of the plurality of legs such that an outer diameter of the angled segment transitions from that of the respective one of the plurality of legs to that of the base along a length of the angled segment.

12. A sealing device comprising:

a grommet formed of flexible material and including:
  a grommet head; and
  a grommet shaft extending from the grommet head and insertable into an object hole defined by one or more objects;
  the grommet defining a grommet bore hole extending through the grommet head and the grommet shaft;
an insert including an insert shaft insertable into the grommet bore hole, the insert defining an insert through hole extending through the insert shaft, the insert forming an upper inner surface and a lower inner surface that define the insert through hole, the upper inner surface forming a cylindrical shape, the lower inner surface extending from the upper inner surface and having a partial conical shape; and
a locking pin including a pin shaft drivable into the insert through hole to retain the grommet shaft within the object hole,
wherein the insert shaft pushes the grommet shaft to flex radially outwardly as the locking pin is driven into the insert through hole to cause the grommet shaft to engage an edge that extends along an object surface to form a seal on a side of the one or more objects.

13. The sealing device of claim 12, wherein the pin shaft form an outer surface that has a cylindrical shape.

14. The sealing device of claim 13, wherein the outer surface of the pin shaft is to engage the upper inner surface of the insert when the locking pin is partially driven into the insert through hole in a as-shipped configuration.

15. The sealing device of claim 13, wherein the outer surface of the pin shaft is to engage the upper inner surface and the lower inner surface of the insert when the locking pin is fully driven into the insert through hole in an installed configuration.

16. The sealing device of claim 13, wherein the pin shaft is to cause the insert shaft to push the grommet shaft to flex radially outwardly as the outer surface of the pin shaft engages the lower inner surface of the insert.

17. The sealing device of claim 12, wherein the insert shaft includes a plurality of legs that are separated from each other and the insert further includes a plurality of feet, each of the plurality of feet extending from an end of a respective one of the plurality of legs, each of the plurality of feet configured to engage the grommet shaft and push the grommet shaft to flex radially outwardly as the locking pin is driven into the insert through hole.

18. The sealing device of claim 12, wherein an air gap is formed between the insert shaft and the grommet shaft when the insert shaft is inserted into the grommet bore hole, the air gap enabling the grommet shaft to flex radially outwardly and conform to the edge extending along the first object surface as the locking pin causes the insert shaft to flex radially outwardly.

19. The sealing device of claim 12, wherein the grommet head includes a grommet head plate defining a grommet outer edge and an outer flange extending from the grommet outer edge of the grommet head plate, the outer flange engageable with a second object surface to form an other seal on an other side of the one or more objects.

20. A sealing device comprising:

a grommet including:
  a grommet shaft insertable into an object hole defined by an object;
  a grommet head including a grommet head plate and an outer flange extending from the grommet head plate, the outer flange engageable with a first object surface to form a first seal on a first side of the object; and
  the grommet defining a grommet bore hole extending through the grommet head and the grommet shaft;
an insert including an insert shaft insertable into the grommet bore hole, the insert defining an insert through hole extending through the insert shaft; and
a locking pin including a pin shaft drivable into the insert through hole to retain the grommet shaft within the object hole,
wherein, when the insert shaft is inserted into the grommet bore hole, the insert shaft and the grommet shaft form an air gap that enables the insert shaft to push the grommet shaft to flex radially outwardly as the locking pin is driven into the insert through hole in order to cause the grommet shaft to engage a flat or deformed edge extending along a second object surface to form a second seal on a second side of the object.

\* \* \* \* \*